UNITED STATES PATENT OFFICE.

W. T. SALIE, OF BOWDOINHAM, MAINE.

IMPROVED MEDICAL COMPOUND.

Specification forming part of Letters Patent No. 55,911, dated June 26, 1866.

*To all whom it may concern:*

Be it known that I, W. T. SALIE, of Bowdoinham, in the county of Sagadahoc and State of Maine, have invented a new and Improved Medical Compound; and I do hereby declare that the following is a full, clear, and exact description thereof, which will enable others skilled in the art to fully understand and make use of the same.

The present invention relates to a new and improved medical compound to be used for the cure of diphtheria, sore throat, and canker in the mouth, and for any disease to which it may be applicable, experience and practice having demonstrated its effectiveness and reliability in the cure of the diseases above mentioned, as well, also, as its usefulness when applied to sprains, bruises of the skin and flesh, and many other similar complaints; the compound, however, for the cure of canker especially, being of the utmost advantage and importance.

The several ingredients of which my improved medical compound is composed, as well as the proportions and the manner in which they are respectively and severally compounded, are as follows—viz: white-oak bark, steeped in water or other suitable liquid in any proper manner to produce a strong decoction, and new rum, equal quantities of each, the latter being reduced by burning or in any other suitable manner one eighth its bulk or amount.

The decoction of white-oak bark and new rum are first mixed together, after which such a quantity of alum is added as will be dissolved by them, when, to impart a flavor to the preparation, checkerberry, sassafras, or other suitable flavoring material may be added in a sufficient quantity or quantities therefor.

In using the medical compound above described for cases of diphtheria, it is to be taken every half hour as a gargle until the coating or gathering is removed from the throat, and then every two or three hours. When used for children too young for gargling a swab should be employed.

The proportions of the various ingredients herein specified as composing my improved medical compound may be changed; but when mixed in the proportions named beneficial results have been produced with the compound.

I claim as new and desire to secure by Letters Patent—

A medical compound composed of the several ingredients herein named, and either with or without a flavoring material or substance, when mixed together in about the proportions described, as and for the purposes specified.

W. T. SALIE.

Witnesses:
    H. R. HINKLEY,
    A. S. PURINTON.